United States Patent [19]

Von Holdt

[11] Patent Number: 4,881,715
[45] Date of Patent: Nov. 21, 1989

[54] SAFETY LIFT LOCK WITH INTERNAL MEMBER

[76] Inventor: John W. Von Holdt, 6864 Lexington La., Niles, Ill. 60648

[21] Appl. No.: 292,248

[22] Filed: Dec. 30, 1988

[51] Int. Cl.$^4$ .............................................. B29C 33/30
[52] U.S. Cl. .................................. 249/165; 52/125.6; 72/470; 100/918; 164/341; 425/151; 425/192 R; 425/541; 425/595; 425/451.9
[58] Field of Search ............... 249/160, 163, 165, 166, 249/167, 168, 205; 425/151, 190, 192 R, 193, 195, 541, 595, 451.9, DIG. 221; 100/918; 164/341, 342, 339, 343; 72/456, 446, 462, 448, 470; 52/125.2, 125.4, 125.5, 125.6, 127.5

[56] References Cited

U.S. PATENT DOCUMENTS

| 3,909,180 | 9/1975 | Von Holdt | 425/451.9 |
| 4,004,448 | 1/1977 | von Holdt | 72/462 |
| 4,403,810 | 9/1983 | Bieneck | 425/595 |
| 4,487,564 | 12/1984 | Von Holdt | 425/451.9 |
| 4,655,275 | 4/1987 | Wörner | 164/341 |
| 4,702,456 | 10/1987 | Von Holdt | 249/165 |
| 4,706,926 | 11/1987 | Von Holdt | 249/169 |
| 4,753,415 | 6/1988 | Von Holdt | 249/160 |

Primary Examiner—James Housel
Attorney, Agent, or Firm—Allegretti & Witcoff, Ltd.

[57] ABSTRACT

A mold which comprises a pair of mating, openable and closeable mold halves and a lock to hold the mold halves together. The lock is defined by a recess in the outer surface of one of the mold halves. A lifting bridge crosses the recess, being proportioned to permit a lifting hook in the recess to pass underneath to engage the bridge. An elongated member is secured to the other of the mold halves, being slidably extendable into the recess when the mold halves are substantially closed. The elongated member defines a longitudinal slot facing outwardly of the recess in closed position to receive at least a portion of the lifting hook as the hook engages the bridge. The slot defines an end opposed to the other mold half which is closed, to prevent a hook portion in the slot from sliding past the opposed end. Thus, the mold in closed position cannot be opened while the lifting hook is present in the slot.

10 Claims, 1 Drawing Sheet

SAFETY LIFT LOCK WITH INTERNAL MEMBER

BACKGROUND OF THE INVENTION

Large, two piece molds are desirably often moved with the respective two pieces, typically the mold core and the mold cavity, secured together. This, in turn, represents a potential safety hazard, requiring a reliable, foolproof lock to hold the mold halves together as they are lifted and transported. Should one attempt to lift such a mold system with a hook that is secured to only one of the mold halves, a fatal accident could occur if the other mold half falls out of engagement with the lifted mold half and lands on the floor. Even if no injuries are sustained by the accident, the damage to the mold half can run to many thousands of dollars.

Various mold locks have been proposed for addressing this safety issue. For example, see von Holdt U.S. Pat. Nos. 3,909,180; 4,004,448; 4,487,564; 4,702,456; 4,706,926; and 4,753,415.

Particularly referring to the latter cited U.S. Pat. No. 4,753,415, this simple mold lock structure utilizes a pair of bridges, each carried by one of the mold halves and adapted to be placed in abutting relation with the bridge of the other mold half. Thus, a lifting hook can lift both bridges at the same time, to lift both mold halves in a positively locked manner. The system is essentially foolproof, when no other means is provided on the mold for lifting, since the user is then forced to properly engage the hook with the two abutting bridges for safe lifting of the two mold halves together.

As one disadvantage of the aforesaid patent, the respective two bridges must be positioned at the parting line of the mold. If the parting line is not on the transverse center of gravity plane of the mold, the mold will tilt at an undesirable angle upon lifting with the hook, since it will be substantially off balance.

In accordance with this invention, a simplified, safe system is provided for lifting a pair of mold halves, preferably with a bridge positioned substantially on the center of gravity plane, even when the parting line of the mold is substantially spaced from the center of gravity plane. A center of gravity plane is defined to be that transverse plane through the mold at which the mass of the mold is equally spaced on both sides of the plane, so that lifting of the mold with a hook by means of a bridge spaced on such plane will cause the mold to be essentially balanced, to avoid radical canting thereof as it is lifted.

DESCRIPTION OF THE INVENTION

In this invention, a mold is provided which comprises a pair of mating, openable and closable mold halves having a lock to hold the mold halves together on being lifted. By this invention the improved lock comprises, in combination, a recess defined in the outer surface of one of the mold halves. A lifting bridge crosses the recess, and is proportioned to permit a lifting hook to pass in the recess underneath the bridge to engage the bridge, to lift the mold.

An elongated member is also provided, secured to the other of the mold halves. The elongated member slidably extends into the recess when the mold halves are substantially closed, but substantially separates from the recess when the mold halves are open.

The elongated member defines a longitudinal slot which faces outwardly of the recess in the closed position to receive at least a portion of the lifting hook as the hook engages the bridge. The slot in the elongated member defines an end which is opposed to the other mold half, which end is closed to prevent a hook portion in the slot from sliding in the slot past the opposed end. As the result of this, the mold in closed position cannot be opened while the lifting hook is present in the slot. Thus, if the mold is closed, and if it can be engaged with a hook in the recess, it can be safely lifted without opening, constituting a substantially foolproof system in which it is exceedingly difficult to make an injurious mistake.

Preferably, the elongated member is tubular in shape, with the longitudinal slot extending completely through the elongated member to give more engagement room for a lifting hook in the recess.

By this invention, it becomes possible for the lifting bridge to be positioned at a location spaced from the parting line of the mold halves, since the elongated member may be secured to the other mold half, and may project across the parting line for any desired length into the one mold half until it passes under the lifting bridge defined in the one mold half. Preferably, the lifting bridge in the one mold half is then positioned on substantially the center of gravity plane of the mold in closed position, to avoid substantial canting of the mold as it is lifted.

Thus, a safe, substantially foolproof lifting mechanism is provided for molds. The mechanism is inexpensive, and may be applied, if desired, to previously manufactured molds which are already in use, to increase their safety.

While the invention of this application is specifically contemplated for use with two-piece molds, it may also be used with other cumbersome and potentially dangerous equipment such as dies, or any other bulky, heavy structures of two or more separable pieces. Such devices are intended to be included in the term "mold" as equivalents.

DESCRIPTION OF SPECIFIC EMBODIMENT

Figure 1:
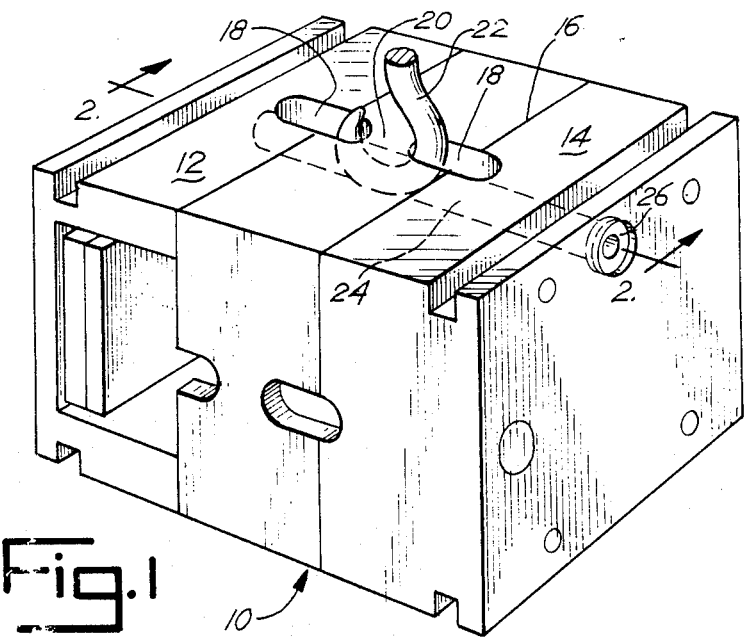
FIG. 1 is a perspective view of a two-piece mold assembly in accordance with this invention, with a lifting hook engaged for safe lifting of the two-piece mold without accidental separation.

Referring to the drawings, FIG. 1 shows a mold assembly which is of generally conventional design for an injection mold, except as otherwise described herein. Specifically, the mold assembly 10 shows the two-piece mold base comprising mold base portions 12, 14 which respectively carry a conventional mold core and mold cavity, and which separate along parting line 16. These mold base portions constitute the pair of mating mold halves as described above, or the mating mold halves may be of any other and different design as may be desired.

In accordance with this invention, a recess 18 is defined in the outer surface of mold base portion 12. Lifting bridge 20 is formed to cross recess 18, being of sufficient strength to permit the lifting of mold 10 by means of an engaging lifting hook 22 or the like, which passes into recess 18 underneath lifting bridge 20 to then engage lifting bridge 20 for lifting of mold 10 as shown in FIG. 3.

Figure 2:
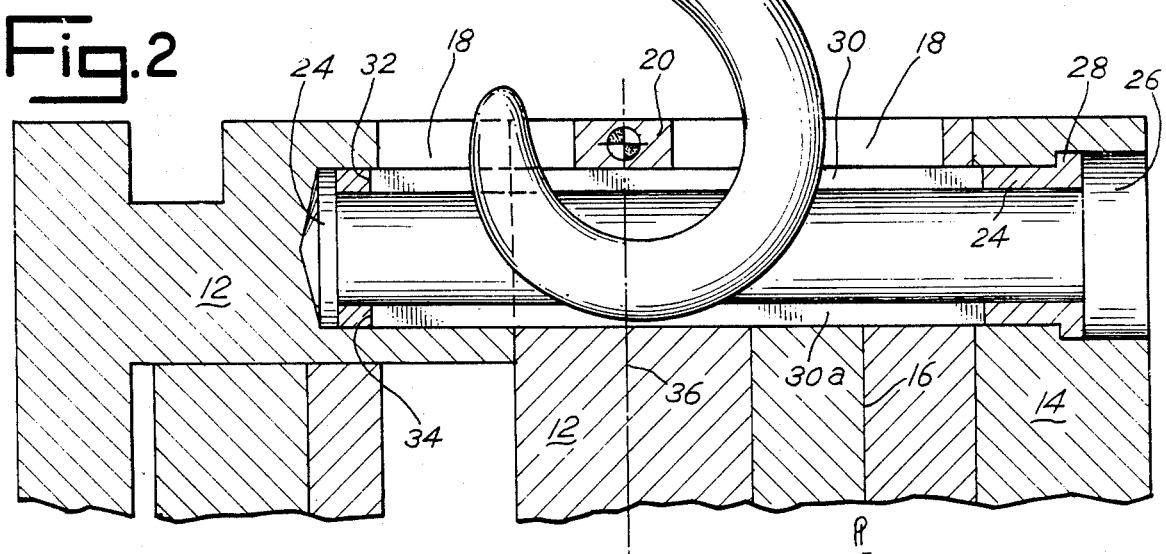
FIG. 2 is a sectional view along line 2—2 of FIG. 1, showing how the lifting hook has substantial clearance within the mold to move into engagement with the lifting bridge.
Figure 4:
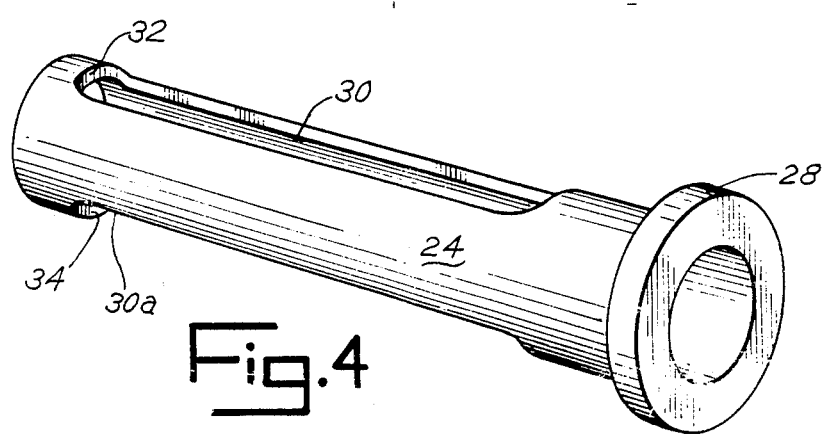
FIG. 4 is a perspective view of the particular elongated member in accordance with this invention used with the mold of FIGS. 1-3.

In accordance with this invention, an elongated member 24, typically either a slotted rod or tube, is secured to mold base portion 14 within stepped hole 26 by means of end flange 28 on tubular member 24 as specifically illustrated in FIG. 2. Alternatively, elongated member 24 may be secured to mold base portion 14 by a simple transverse bolt or the like, to eliminate the need for the stepped structure of hole 26 and flange 28. Elongated tubular member 24 extends from mold base portion 14, across parting line 16, into mold base portion 12, as shown. Tubular member 24 is not secured to mold base portion 12, so that opening and closing of mold base portions 12, 14 causes tubular member 24 to be slidably extended into recess 18 when the mold halves and mold base portions 12, 14 are substantially closed, (as in FIG. 2) and to be substantially separated from recess 18 when the mold halves and mold base portions 12, 14 are open. However, it is understood that elongated member 24 does not necessarily have to be completely separated from recess 18 in the open position as long as it does not interfere with molding operations.

Figure 3:
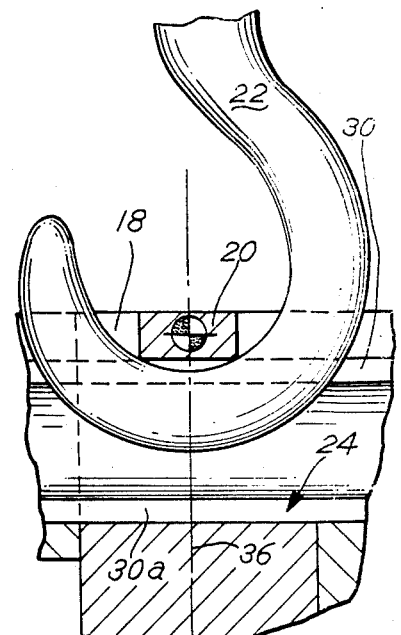
FIG. 3 is a fragmentary, sectional view similar to FIG. 2, but showing the hook in engagement with the lifting bridge as during a lifting process.

Elongated member 24 defines a longitudinal slot 30 which faces outwardly of recess 18 in the closed position, to receive at least a portion of lifting hook 22 as the hook engages bridge 20, as specifically shown in FIGS. 2 and 3. Additionally, slot 30 preferably extends all the way through elongated member 24 as indicated at reference numeral 30a in FIGS. 2 and 3. The purpose of this is to give a bit more clearance room for hook 22 as it is brought into engagement with lifting bridge 20.

Slot 30 and preferably slot 30a each define a closed end 32, 34 at the slot end which is opposed to mold base portion 14. Thus, while hook 22 is in the position shown in FIGS. 2 and 3, if the mold halves 12, 14, start opening, the opening process will stop when the end portions 32, 34 impinge against hook 22. Thus, the mold portions 12, 14 are inherently locked together while lifting hook 22 is so positioned. If desired, "less play" between the mold halves 12 and 14 may be provided by bringing closed ends 32, 34 closer to the area of hook 22, subject to the ability of hook 22 to be inserted and removed from its position as shown.

It can be seen that lifting bridge 20 is positioned at a location which is substantially spaced from parting line 16 between mold halves 12, 14. Preferably, lifting bridge 20 is positioned on substantially the center of gravity plane 36, as defined above, to avoid potentially canting or tilting of mold 10 as it is lifted by hook 22. Thus, a substantially foolproof blocking system is provided for two engaging mold halves, actuated simply by hooking the mold at a lifting bridge preferably near the center of gravity plane while in the closed position, irrespective of the location of the parting line.

It is generally preferred for elongated member 24 to be secured to the mold half 14 which is on the side of parting line 16 that is opposed to center of gravity plane 36, as particularly shown in FIG. 2.

The improvement of this invention is easily manufacturable, being applicable to retrofitting on previously manufactured molds. One simply forms recess 18 and hole 26 in the manufactured mold, leaving bridge 20 as part of the original mold structure positioned preferably along center of gravity plane 36. One then simply inserts and secures elongated member 24 in its proper place, to adapt conventional molds to perform operations having greatly improved safety.

As one advantage of this invention, the elongated member does not bear any significant transverse load. The largest load it may bear is the longitudinal load against end members 32, 34 as they press against the hook 22. Thus, elongated member 24 does not have to be made to be of very high strength.

The above has been offered for illustrative purposes only, and is not intended to limit the scope of the invention of this application, which is as defined in the claims below.

That which is claimed is:

1. In a mold which comprises a pair of mating, openable and closable mold halves and a lock to hold the mold halves together while being lifted, the improvement comprising, in combination:

a recess defined in the outer surface of one of said mold halves; a lifting bridge crossing said recess and proportioned to permit a lifting hook to pass in the recess underneath said bridge to engage said bridge to lift the mold; an elongated member secured to the other of said mold halves, said member slide ably extending into said recess when the mold halves are substantially closed and substantially separated from said recess when the mold halves are open, said elongated member defining a longitudinal slot facing outwardly of said recess in said closed position to receive at least a portion of said lifting hook as the hook engages said bridge, said slot defining an end opposed to said other mold half which is closed to prevent a hook portion in the slot from sliding in the slot past said opposed end, whereby said mold in closed position cannot be opened while the lifting hook is present in said slot.

2. The mold of claim 1 in which said elongated member is tubular.

3. The mold of claim 1 in which said lifting bridge is positioned at a location spaced from the parting line between said mold halves.

4. The mold of claim 3 in which said lifting bridge is positioned on substantially the center of gravity plane of the mold in closed position.

5. The mold of claim 4 in which said elongated member is secured to said one mold half on the side of the parting line that is opposed to the center of gravity plane.

6. The mold of claim 1 in which said longitudinal slot extends completely through said elongated member.

7. In a mold which comprises a pair of mating, openable and closable mold halves, and a lock to hold the mold halves together while being lifted, the improvement comprising, in combination:

a recess defined in the outer surface of one of said mold halves; a lifting bridge crossing said recess and proportioned to permit a lifting hook to pass in the recess underneath said bridge to engage said bridge to lift the mold; an elongated member secured to the other of said mold halves, said member slidably extending into said recess when the mold halves are substantially closed, and substantially separated from said recess when the mold halves are open, said elongated member defining a longitudinal slot facing outwardly of said recess in closed position to receive at least a portion of said lifting hook as the hook engages said bridge, said lifting bridge being positioned at a location spaced from the parting line between said mold halves, said slot defining an end opposed to said other mold half which is closed to prevent a hook portion in the slot from sliding in the slot past said opposed end, whereby said mold in closed position, cannot be opened while the lifting hook is present in said slot, said elongated member being secured to said one mold half on the side of the parting line that is opposed to the center of gravity plane of said mold.

8. The mold of claim 7 in which said lifting bridge is positioned on substantially the center of gravity plane of the mold in closed position.

9. The mold of claim 8 in which said elongated member is tubular.

10. The mold of claim 9 in which said longitudinal slot extends completely through said elongated member.

* * * * *